Jan. 13, 1959　　　A. J. KLEIN　　　2,868,085
TOOL FOR TAPERING CONDUIT OR PIPE ENDS
Filed June 24, 1954

INVENTOR.
ANDREW J. KLEIN
BY
ATTORNEY

United States Patent Office 2,868,085
Patented Jan. 13, 1959

2,868,085

TOOL FOR TAPERING CONDUIT OR PIPE ENDS

Andrew J. Klein, Milwaukee, Wis., assignor to McGraw-Edison Company, a corporation of Delaware Application June 24, 1954, Serial No. 439,113

1 Claim. (Cl. 90—12)

The present invention relates to a tool for cutting a taper on an end of a cylindrical object, including tubular members such as conduit or pipe, and has particular application in tapering ends of fiber pipes or conduit during field installation.

In recent years there have been a number of improved devices introduced for providing a taper at one or both ends of a pipe or conduit. These devices have all had the general object of providing a portable tool which may be used in the field for salvaging short lengths of composition pipe. This pipe is conventionally used for underground electrical conduit and for low pressure plumbing installations, and is preferably joined in end-to-end relationship by means of tapered fittings. Composition pipes lend themselves to providing a very simple junction with fittings by merely mechanically forcing the cooperating members together to provide a tight seal. In addition, it is the general practice to prefabricate pipe and conduit to prescribed lengths, which require cutting where bends are prescribed or at prescribed places for insertion of various fittings such as T's and L's, or at the termination of the pipe or conduit run. It will be apparent that when a length is cut in the field, it will require a tapering operation at the cut portion for insertion of the various fittings. It has, therefore, also been a general object of recent contributions to provide a tool for such field practice, which eliminates calculating and ordering pipe lengths with factory-made tapers to prescribed specifications, and which permits the salvage of short lengths of pipe.

A variety of tapering tools have been heretofore provided, and although they will cut an acceptable taper, they are quite complex and expensive to manufacture, requiring a variety of machined parts. In cases where conduit or pipe made with an impregnant of coal tar pitch and where the pipe is made from an abrasive composition such as Portland cement and asbestos, there has been the problem of chips and cuttings getting between mating members. It has been the past practice to provide an expandible mandrel, which is positioned in the bore of the conduit or pipe to provide a support for the toolholder and to act as a guide or "way" for the cutterhead to advance during tapering operations. It will be obvious that an expanding mandrel, in any form, requires relatively complicated cooperating members, and as far as can be determined, all require a threading arrangement to actuate the expandible member. The threads must be kept very clean to operate properly and to prevent "freezing" between the cooperating threaded members.

It is a primary object of the present invention to provide a tapering tool having a single lead-in guide member for supporting the cutterhead during axial advancement thereof, and which provides an open framework cutterhead providing a minimum of interference with chips and cuttings whereby they may fall to the outside of the object to be tapered and free from any cooperating members of the taper tool.

It is another object of the present invention to provide a tapering tool which will readily lend itself to driving engagement with a power drive means, such as a drill or hole shooter, and where desired, may be fitted with a manually operated crank.

It is a further object of the present invention to provide a tapering tool of minimum external dimensions permitting adequate clearance between closely related conduit or pipe members, as in a series of risers terminating from underground electrical installation.

It is still another object of the present invention to provide an economical and simplified tapering tool, having tool bits which are readily installed in a prepositioned toolholder positioned in a relatively simplified cutterhead, requiring a minimum of skill, and further which bits are positioned to provide a sharp taper cutting edge with a trailing scraping and polishing to permit any chips and cuttings to be readily removed from the tapered surface and away from any related movable parts.

An embodiment of the invention is illustrated in the accompanying drawing, in which.

Figure 1:
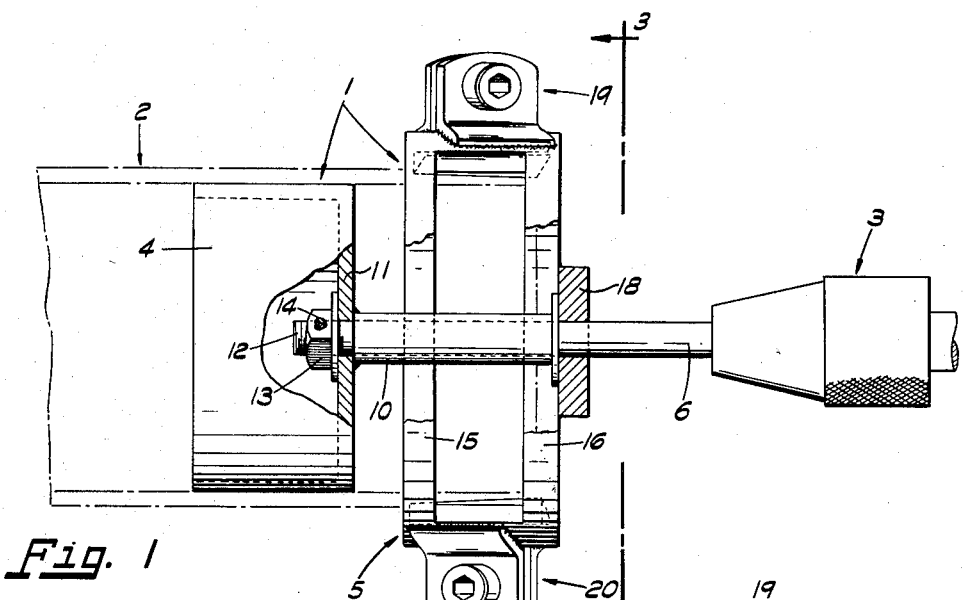
Fig. 1 is a side elevation of the tapering tool, partly in section, and shown in conjunction with a conduit or pipe, which pipe is shown in phantom, and further illustrating a chuck of a power driven drill engaging the revoluble spindle of the tool.

The embodiment illustrated in the various views is directed to a novel tapering tool denoted generally by the reference character 1, and as shown in Fig. 1, having completed a tapering operation on a fiber pipe or conduit tube. The drive means is indicated generally in Fig. 1 by the reference character 3, and may take the form of a conventional utility drill or "hole shooter." The power for the drill may be obtained from a drop cord connected to any convenient electrical outlet, and if such outlet is not available, a small motor-generator unit may be provided for field use.

The simplified tapering tool comprises three major cooperating elements taking the form of a guide member or mandrel 4, a cutterhead 5, and a revoluble spindle 6. As shown in Fig. 1, the axial extension of the spindle 6 may be connected with a power drive means 3, or may be readily adapted for connection with a conventional manually operated rotatable crank (not shown). However, the embodiment shown is preferably operated by a power driven means, such as a drill, which may be supported manually while it is rotating. Thus, the guide mandrel 4 is utilized to its fullest extent as a slidable lead-in guide means for the advancement of the cutterhead responsive to movement in a cutting direction by the operator of the power driven device.

The use of a power driven device also permits the external dimension of the cutterhead to be maintained at a minimum. It will be appreciated that in field installations of electrical conduit and in certain plumbing installations, there is a minimum of clearance between the object to be tapered and surrounding objects. This is especially true where a series of risers extend vertically from an underground electrical installation to permit electrical cable emanating from under ground installation to be connected to equipment and conductors installed above the ground or elevated on electrical pole cross-arms. These installations are maintained in special relationship by means of concrete or other reinforcing media. It is preferred practice to set the various risers and pour concrete around them. After the concrete sets, the conduits are cut off and tapered to a prescribed height above the ground surface. The risers are generally placed at a minimum of 6" apart, which ordinarily would seriously limit the length of the manually operated crank for providing a taper to the exposed end. A crank member of adequate length for efficient operation obviously would be longer than 6" where the external dimension of the conduit exceeds 4". The structure shown in Figs. 1 thru 4 very definitely permits a minimum in external dimensions of the cutterhead for providing a taper in any installation of pipe or conduit.

Another problem that often occurs in field practice is that the various ends of conduit protruding from a bank of conduits terminate in a relatively small underground "manhole" with a minimum of work area. It will be apparent that, under such circumstances, it would be difficult to manually rotate a lever arm. The prior art devices showing various means for rotating cutterheads have all related to manually operated cranks, and have suggested that the pipe or conduit may be mounted on vices or other supports where they may be tapered prior to installation. However, it has been found, especially in the field of electrical underground work, that the use of vices for field tapering requires merely another set-up operation which detracts from the economies of field practice. The present invention permits an operator to finish off a great number of conduits in a single continuous operation after initial installation.

Figure 2:
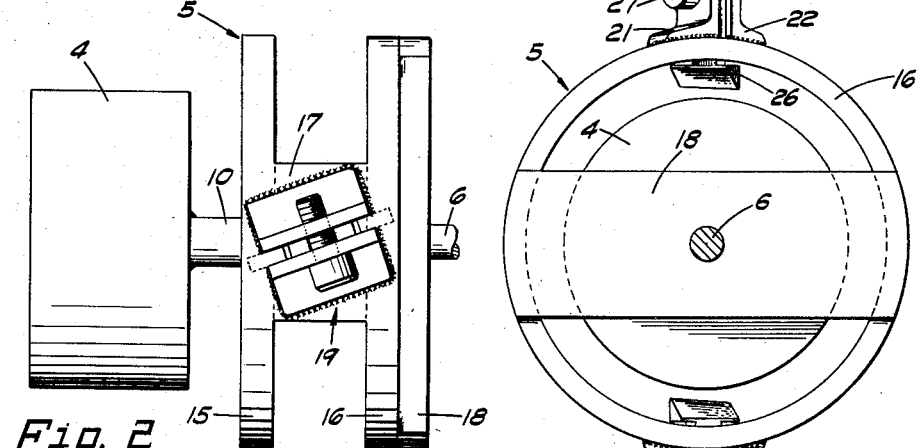
Fig. 2 is a plan view of the tapering tool.
Figure 3:
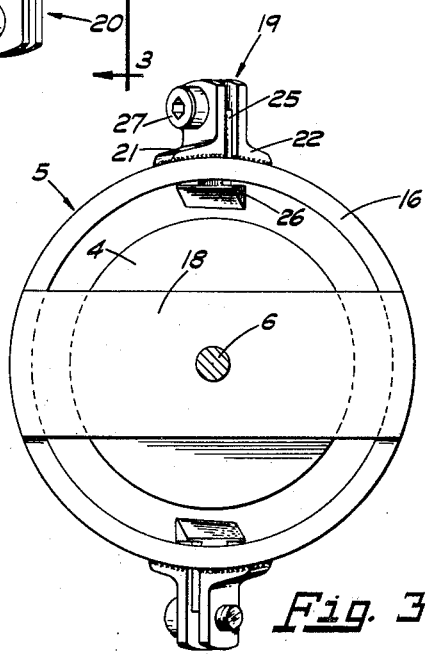
Fig. 3 is an end view of the tapering tool taken on lines 3—3 of Fig. 1.

Referring again to the drawing, and especially to Figs. 1–3, the tapering tool comprises the lead-in mandrel 4 which is cylindrical in shape, and is preferably hollow, as shown in Fig. 1 to reduce its weight. The mandrel is provided with an intergral sleeve member 10 extending longitudinally from the base portion 11. The sleeve is in fixed relationship with the mandrel and rotatable relative to the spindle to provide a longitudinal support for the revoluble spindle 6. The guide means or mandrel 4 is preferably slidable within the bore of the object to be tapered. As shown in Fig. 1, the external diameter of the mandrel closely approximates the internal diameter of the pipe or conduit 2 in order to give a sliding support that is substantially free from any angular displacement of the revolving spindle from the axis common to the spindle and to the pipe or conduit. It is conventional practice in the trade to provide pipe and conduit of standardized internal diameters with prescribed tolerance limits. The mandrel will therefore operate effectively in all pipes and conduits of a selected size.

The spindle 6 terminates at one end in a threaded portion 12 for receiving a lock nut and washer assembly 13. A conventional nut may be provided and is locked in place by means of a cotter pin 14, positioned transversely of the spindle. It is to be noted that the mandrel is freely rotatable with respect to the spindle to permit free action of the spindle and a relatively firm support of the mandrel in the bore of the pipe or conduit 2.

The cutter head 5 is of a general cylindrical shape arranged to telescopically receive the pipe or conduit 2 and preferably contains an open frame work provided by spaced apart ring members 15 and 16 integrally joined by diametrically opposed toolholder support portion 17. The cutterhead is integrally supported on the spindle 6 by means of a transverse strap 18. The rings 15 and 16 define slots therebetween which permit chips and cuttings removed from the tapering operation to fall to the ground where they will not lodge in any of the cooperating members. It will be obvious that the cutterhead is preferably provided from a metal pipe or tube slotted by opposed saw cuts transversely of the pipe or tube.

Although the spindle is shown integral with the strap 18, it will be apparent that the attachment may be made with a removable retaining means such as a nut and washer (not shown) for replacement of the spindle in case of shearing or other breakage.

Figure 4:
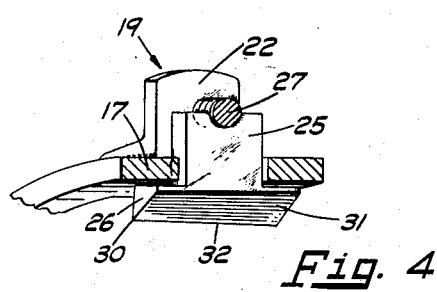
Fig. 4 is a fragmentary sectional view particularly directed to the structure of the toolholder.

The toolholders 19 and 20 are preferably diametrically opposed relative to one another and each comprise opposed L-shaped bracket members 21 and 22 integral at their base with the supports 18 of the cutterhead 5. The supports 18 are slotted to receive a mounting tongue 25 extending from the tool bits 26. The tongue is grasped between the opposed brackets 21 and 22 and secured therebetween by means of a set screw 27 radially removed from the cutterhead 5 and normally forcing the outer ends of the brackets towards one another to provide a gripping engagement with the tongue 25. As shown in Fig. 4, the set screw 27 also acts as an indexing stop for the tongue 25 by engaging an arcuate seat on the free end of the tongue.

Although two opposed tool bits are shown in the preferred embodiment, it is within the province of this invention to provide a single unit, which may be dynamically balanced by means of an opposed counterbalance member (not shown) on the cutterhead. The tool bits 26 are provided with a cutting point 30 (see Fig. 4) and an angular side rake portion 31 defining an elongated trailing edge 32 for scraping and polishing the taper after the initial cut. In the case of fibrous pipe or conduit impregnated with a plastic such as coal tar pitch, this operation tends to fill any voids and provides a smooth surface for optimum sealing relationship with a fitting member (not shown).

It will be apparent that the device is operated by simply inserting the external protruding end portion of the shank 6 in a chuck member of a drill or other drive means, and positioning the lead-in mandrel 4 in the bore of the pipe or conduit 2 that is to be provided with a taper. This operation may be done either while the power drive means is operating or when no part is rotating. The rotating cutterhead 5 is then advanced forward while rotating to engage the free end of the pipe or conduit 2 and is continued forward until the desired taper length is provided. It will be apparent from Fig. 1 that the cutting point 30 (as shown in Fig. 4) cuts a taper at a predetermined angle and the trailing edge 32 acts to scrape away the chips and cuttings to fall to the ground below. The gap between the tool bit and the tapered surface, as shown in Fig. 1, is slightly exaggerated to point up the detail of the taper. While the cutterhead is rotating and advancing, the lead-in mandrel provides a guide and support for the telescoping members. After the desired taper has been provided, the tool is backed off of the pipe or conduit and the mandrel is ready for immediate insertion into the bore of another pipe or conduit to be tapered. It will be apparent, that no adjustments are required, as in the previous devices, for removing and setting up the tool prior to making the desired cut or machining operation.

It will be apparent from the foregoing, that a relatively simplified taper tool has been described for providing optimum performance under any field conditions, and which tool may be used for tapering objects that are closely positioned relative to one another and in confined working areas. The tapering tool is readily adaptable to either power drive means or may be fitted with a manually operable crank where desired. A minimum number of relatively movable parts are provided, and the construction lends itself to the elimination of substantially all chips and cuttings from the work area in order that none of the cooperating members may become clogged or frozen together by any of the impregnants or abrasive materials that may have been used in the manufacture of the pipe or conduit.

I claim:

A tool for externally tapering the outer surface of a portion of a pipe comprising a mandrel to slide within the bore of the pipe, said mandrel having a transverse wall, an annular bore-engaging wall and a bearing extending from opposite sides of said transverse wall, a spindle rotatably mounted in said bearing, an open annular body carried by said spindle and being interiorly of greater diameter than said annular bore-engaging wall to adapt it to surround and slide along the outer surface of the pipe, said body comprising spaced-apart rings, a strap located diametrically of one of said rings with which said spindle is rigid, a support bridging said rings provided with a slot, angularly disposed brackets on the exterior of said support, a bit for tapering said portion of the pipe having a tongue mounted in said slot and extending between said brackets, and securing means for said tongue mounted by said brackets.

References Cited in the file of this patent

UNITED STATES PATENTS

| | | |
|---|---|---|
| 625,585 | Miller | May 23, 1899 |
| 794,989 | Kohler | July 18, 1905 |
| 1,678,712 | Smith | July 31, 1928 |
| 1,823,959 | Steinmayer | Sept. 22, 1931 |
| 2,322,695 | Kinzbach | June 22, 1943 |
| 2,343,824 | Wachowitz | Mar. 7, 1944 |
| 2,478,310 | Payne | Aug. 9, 1949 |
| 2,616,462 | Haddican | Nov. 4, 1952 |